United States Patent
Myers

[11] Patent Number: 5,939,621
[45] Date of Patent: Aug. 17, 1999

[54] FLUID LEAK TESTER FOR TORQUE CONVERTER

[76] Inventor: John E. Myers, 14305 Mt. McClellan St., Reno, Nev. 89506

[21] Appl. No.: 08/984,442

[22] Filed: Dec. 3, 1997

[51] Int. Cl.$^6$ .................................................. G01M 19/00
[52] U.S. Cl. .......................................... 73/49.7; 73/118.1
[58] Field of Search ........................ 73/49.7, 47, 40.5 R, 73/40, 116, 117.2, 117.3, 118.1

[56] References Cited

U.S. PATENT DOCUMENTS

| | | | |
|---|---|---|---|
| 4,102,178 | 7/1978 | Mercik et al. | 73/49.7 |
| 4,157,028 | 6/1979 | Moffett | 73/49.7 |
| 4,213,328 | 7/1980 | Roeschlaub et al. | 73/49.7 |
| 4,489,594 | 12/1984 | Smith | 73/49.7 |
| 4,788,857 | 12/1988 | Myers | 73/118.1 |
| 4,809,542 | 3/1989 | Jones | 73/49.7 |
| 5,557,966 | 9/1996 | Corry | 73/49.7 |
| 5,633,459 | 5/1997 | Rodriguez | 73/49.7 |

*Primary Examiner*—George Dombroske
*Attorney, Agent, or Firm*—Theodore J. Bielen, Jr.

[57] ABSTRACT

A testing mechanism for detecting fluid leaks in a torque converter utilizing a seal which closes a passage through the torque converter hub to the interior of the housing of the torque converter. Fluid is then charged into the torque converter and maintained at a certain pressure. The torque converter is then immersed in a liquid found in a container to permit the observation of the escape of fluid from the torque converter.

11 Claims, 4 Drawing Sheets

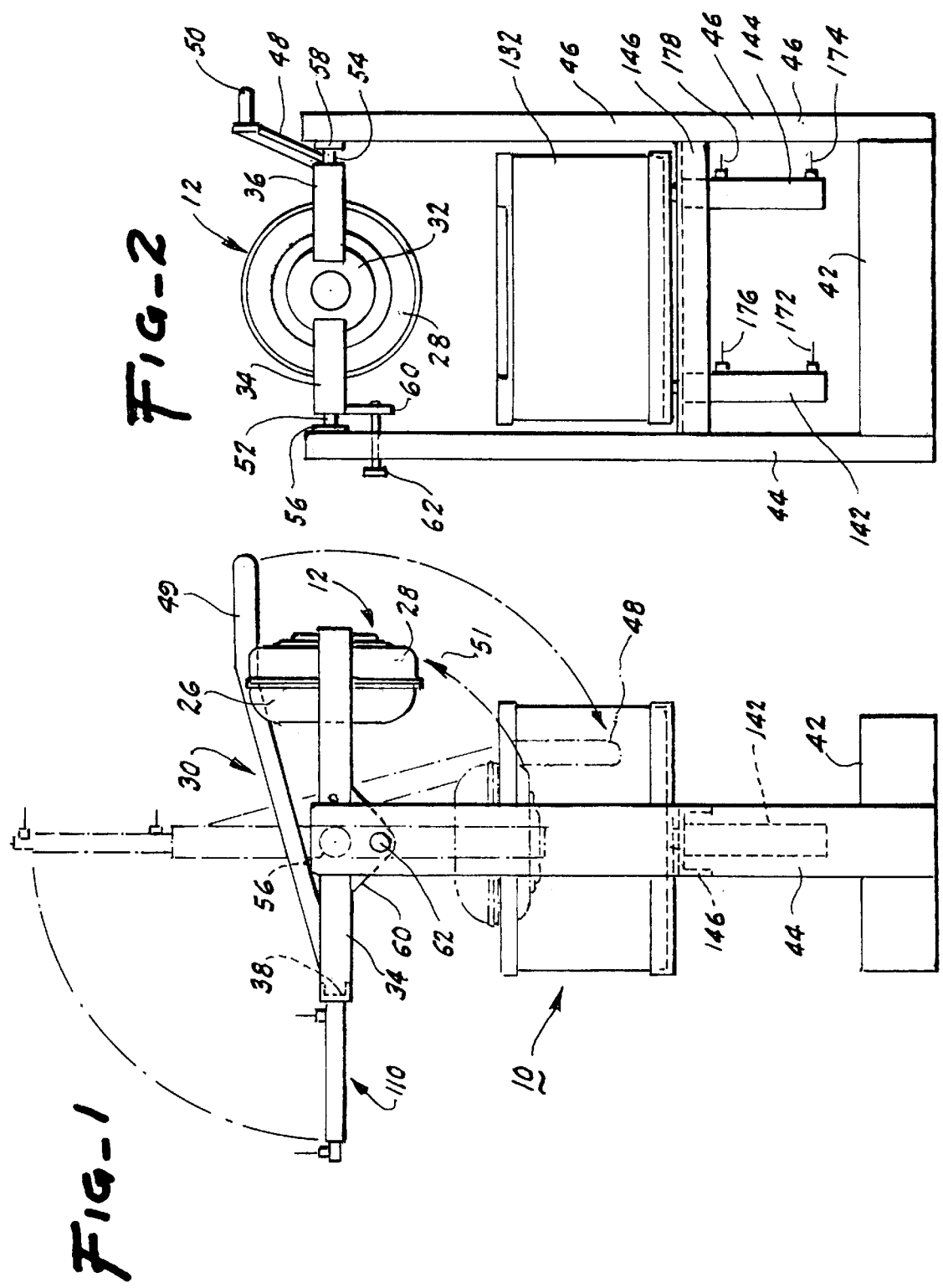

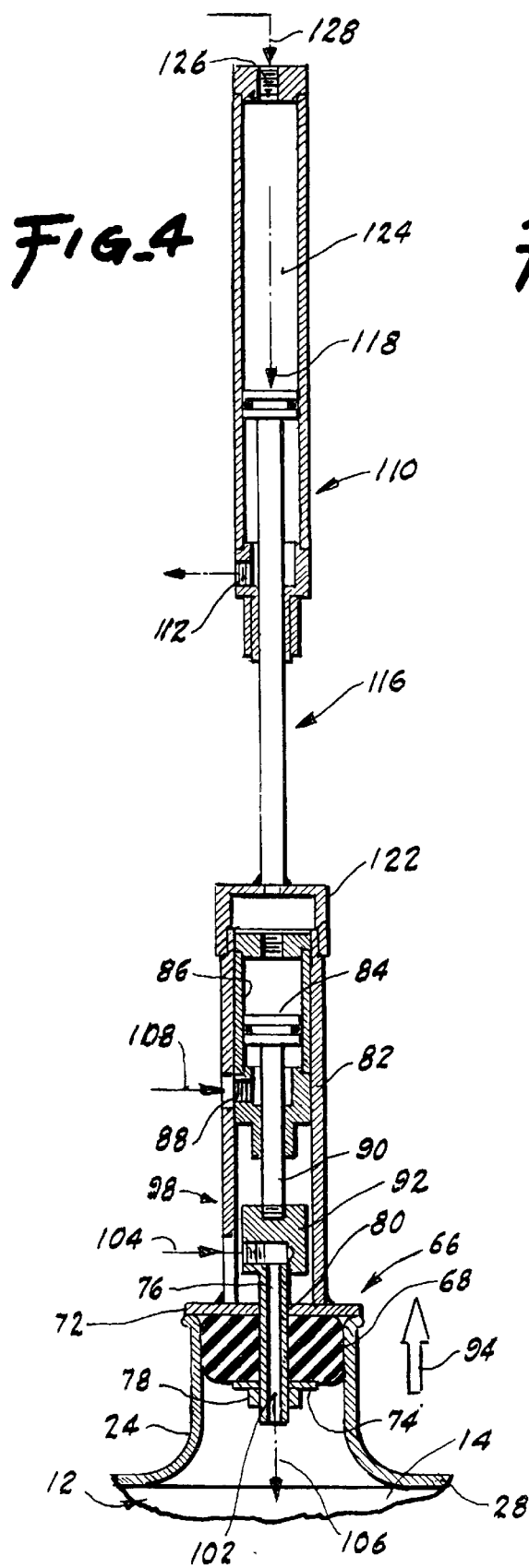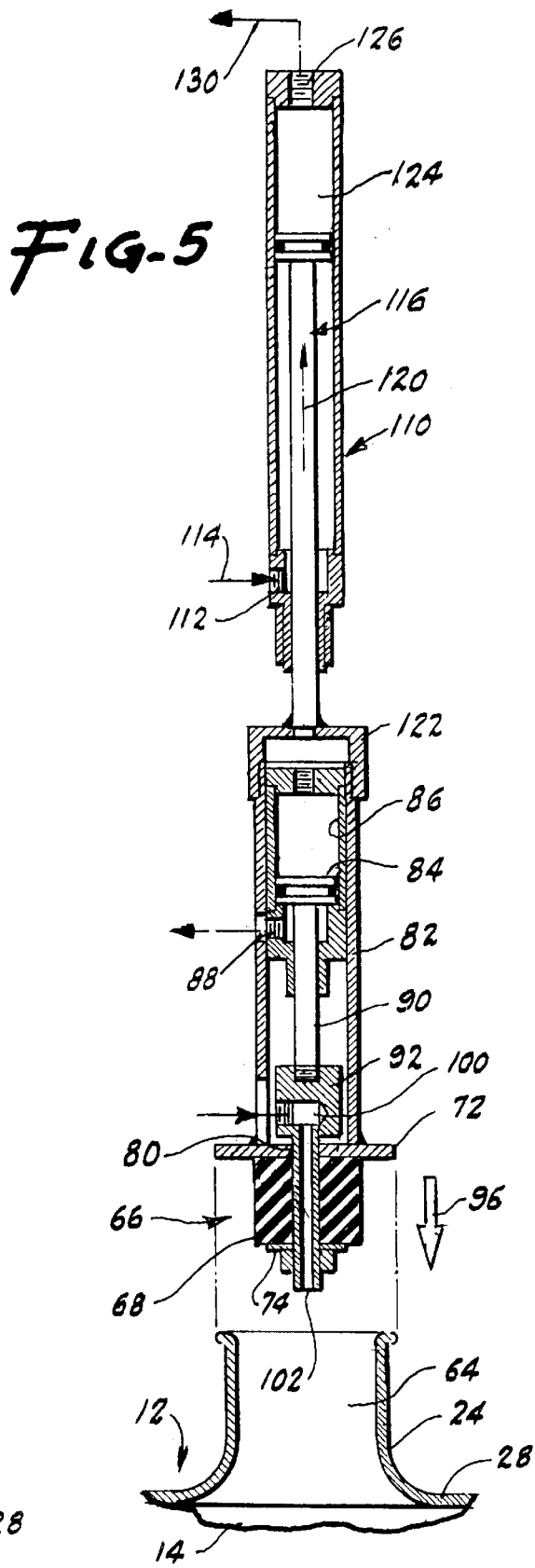

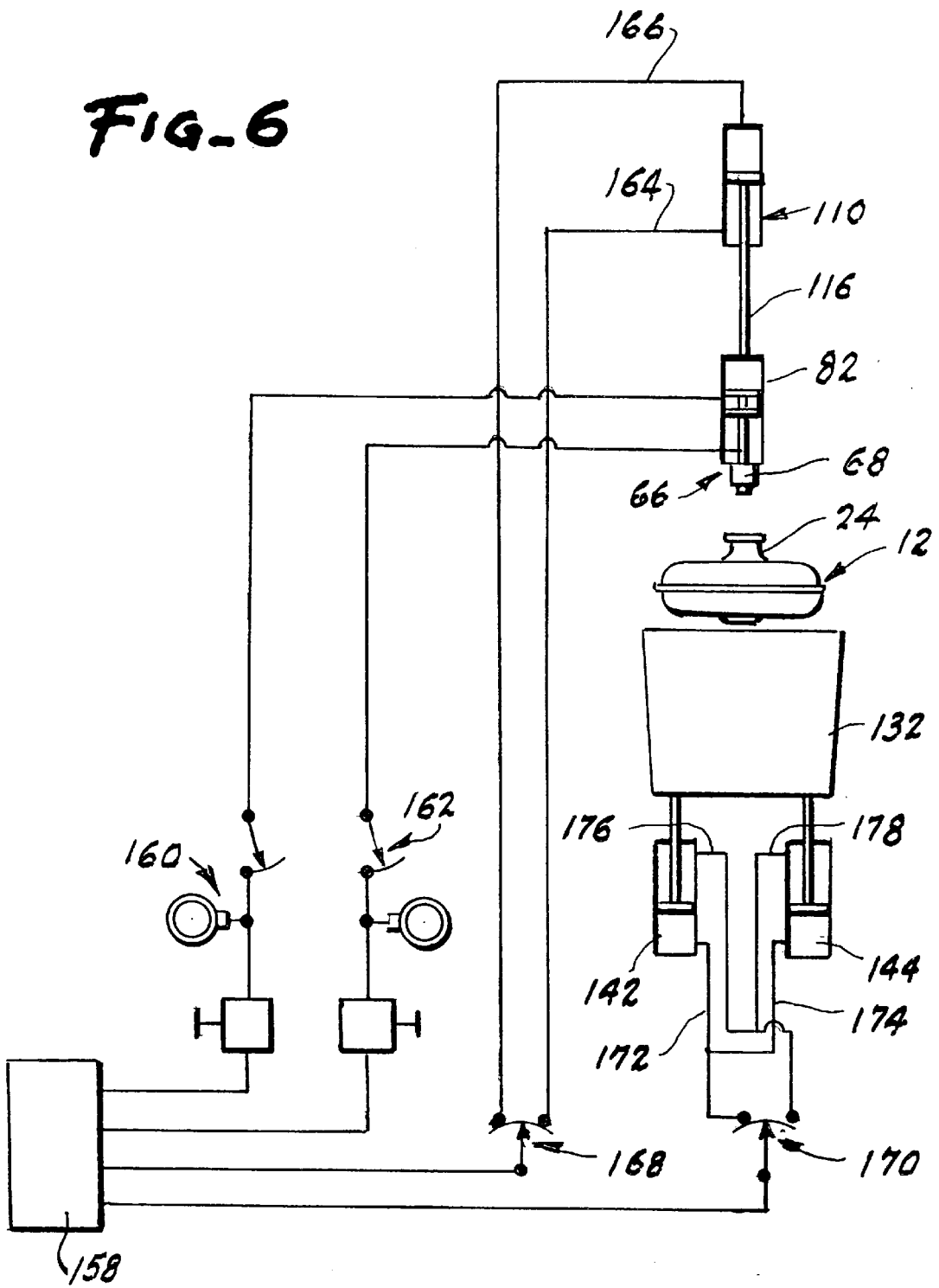

FLUID LEAK TESTER FOR TORQUE CONVERTER

BACKGROUND OF THE INVENTION

The present invention relates to a novel and useful testing mechanism for detecting a fluid leak in a torque converter.

Torque converters are often disassembled for the purposes of repair and maintenance. Certain cases, parts, such as hubs are rewelded to portions of the torque converter housing. In addition, the housing itself is often split and must be rewelded after the repairs have been effected. Such air tight integrity of a torque converter is important to permit the torque converter to operate in a transmission system of an automobile without fluid leaks.

A convenient testing apparatus for detecting fluid leaks in a torque converter would be a notable advance in the transportation field.

SUMMARY OF THE INVENTION

In accordance with the present invention a novel and useful testing mechanism for detecting a fluid leak in a torque converter is herein provided.

The system of the present invention is used in conjunction with a torque converter that has a housing forming an inner chamber and further includes a outwardly extending hub which forms a passage into the interior chamber of the housing. The present invention includes a seal for closing the passage through the hub to the interior chamber of the housing. Such seal may take the form of a deformable plug which is capable of being lowered into the hub passage and then deformed to create the seal. Such deformation may take place by positioning the deformable plug between a pair of plates, one of which is moveable and is connected to a plunger shaft. The plunger shaft may be pneumatically activated in a pneumatic chamber.

Means is also included in the present invention for charging the torque converter housing interior chamber with a fluid. Generally, such fluid may take the form of air, although other gases or liquids may be employed in this regard. Such means may include formation of an aperture through the deformable plug and a provision of pneumatic source for passing air through the aperture and into the interior housing of the torque converter.

A container is also provided for a body of liquid. Moreover, means is included in the present invention for positioning the sealed torque converter into the container for immersion within the body of liquid. Along these lines, a support for the torque converter is provided such that the torque converter is positioned over the container. A mount is also included for the container of the body of liquid. Means is then employed for selectively moving the support for the torque converter and the mount for the container for the body of liquid toward one another. Such movement would cause the torque converter, again, to immerse within the body of liquid of the container. In certain cases, the means for selectively moving the torque converter and the mount for the container would include the provision of an elevator for the liquid container. Such elevator may be pneumatically operated.

Means is also found in the present invention for observing any escape of the fluid from the torque converter housing when the torque converter is positioned within the body of liquid. Such means may simply take the form of constructing the container for the body of liquid as an open container, such that the operator of the testing mechanism of the present invention may visually observe the escape of fluid from the interior housing of the torque converter. Other detection mechanisms may also be used.

Moreover, the testing mechanism of the present invention may additionally comprise the support for the torque converter being rotatably maneuverable. That is to say, the torque converter may be supported for immersion in the container of the liquid or be rotated away from the container in order to repair the torque converter or observe portions of the torque converter before or after immersion in the liquid.

It may be apparent that a novel and useful testing mechanism for detecting a fluid leak in a torque converter is herein provided.

It is therefor an object of the present invention to provide a testing mechanism for detecting a fluid leak in a torque converter in order to quickly and easily determine the air tight integrity of a torque converter.

Another object of the present invention is to provide a testing mechanism for a torque converter to determine the integrity of welds which have been applied to the torque converter during a repair or rebuilding process.

Yet another object of the present invention is to provide a testing mechanism for detecting a fluid leak in a torque converter within a short time period.

Another object of the present invention is to provide a testing mechanism for detecting a fluid leak in a torque converter which is usable with torque converters having various hub diameters.

The invention possesses other objects and advantages especially as concerns particular characteristics and features thereof which will become apparent as the specification continues.

BRIEF DESCRIPTION OF THE DRAWINGS

FIG. 1 is a side elevational view of the testing mechanism of the present invention with the torque converter rotated outwardly from the liquid container.

FIG. 2 is a front elevational view of a testing mechanism of the present invention with the torque converter in the same outwardly rotated position as depicted in FIG. 1.

FIG. 4 is a sectional view taken along line 4—4 of FIG. 3.

FIG. 5 is a sectional view similar to the sectional view of FIG. 4 except that the seal has been released from the hub of the torque converter.

FIG. 6 is a schematic view depicting the pneumatic connections to the testing mechanism of the present invention.

Figure 3:
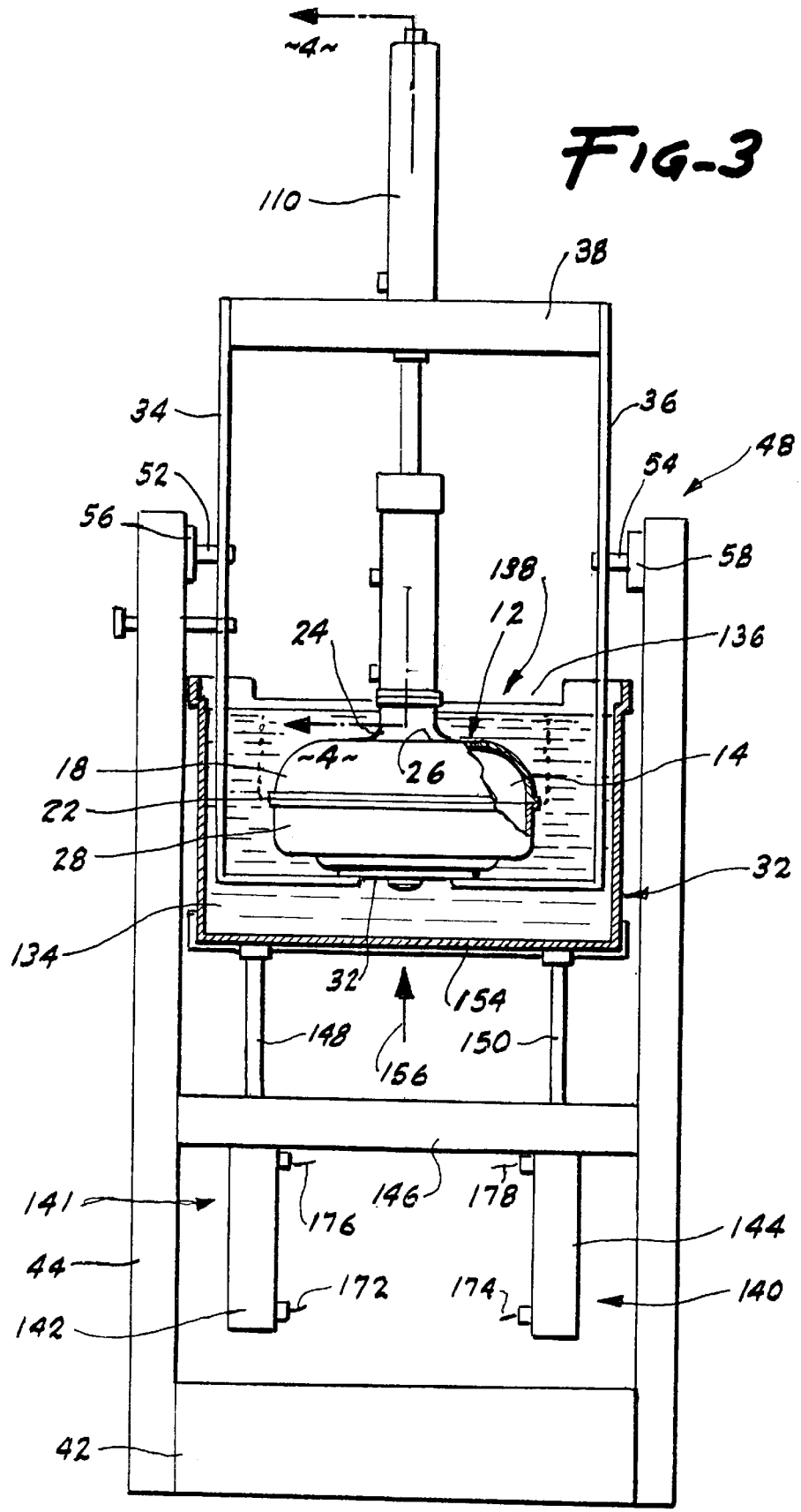
FIG. 3 is a sectional view of the testing mechanism of the present invention with the charged torque converter immersed in the liquid within the liquid container.

For a better understanding of the invention references made to the following detailed description of the preferred embodiments thereof which should be referenced to the prior described drawings.

DETAILED DESCRIPTION OF THE PREFERRED EMBODIMENTS

Various aspects of the present invention will evolve from the following detailed description of the preferred embodiments thereof which should be referenced to the prior described drawings.

The invention as a whole is depicted in the drawings by reference character 10. Testing mechanism 10 is employed in conjunction with a torque converter 12 used in vehicular transmission systems. In general, torque converters such as torque converter 12 may be repaired, rebuilt, or altered after initial manufacture. Such mechanical operations often require welding and resealing of the torque converter at various places. For example, with reference to FIG. 3, torque converter 12 is shown with an interior chamber 14 for enclosing the interior components 16 of torque converter 12. In addition, the upper half or impeller section 18 is welded to the lower half or base portion 20 along seam 22. Moreover, hub 24 is often replaced and rewelded to impeller section 18 at the base 26 of hub 24. Needless to say, imperfect welding may result in fluid leaks at any place on housing 28 of torque converter 12.

Referring now to FIGS. 1 and 2, it may be observed that torque converter 12 is held to a support 30. Support 30 is constructed with a circular base plate 32 which is fixedly connected, by welding or otherwise, to U-shaped arms 34 and 36. U-shaped arms 34 and 36 extend outwardly from base plate 32 and are interconnected by a cross bar 38. Support 30 further includes a stand 40 having a bottom floor mounted portion 42 and a pair of upwardly extending posts 44 and 46. Means 48 is also included in the present invention for rotating a portion of support 30 and torque converter 12 according to directional arrow 50, FIGS. 1–3. Handle 50 permits the operator of mechanism 10 to easily rotate arms 34 and 36, as well as cross bar 38 according to directional arrow 50. Such rotation takes place along pivot pins 52 and 54, FIG. 2, which rotate within bearings 56 and 58, respectively. Flange 60, connects to arm 34. Stop rod 62 extends through post and flange 60 to hold torque converter 12 in a roughly horizontal position, shown in FIG. 2.

With reference to FIGS. 4 and 5, it may be apparent that torque converter 12 hub 24 includes a passage 64 from the exterior of housing 28 to interior chamber 14 thereof. When torque converter 12 is in the configuration shown in FIG. 3, passage 64 constitutes the sole entry into interior chamber 14 of housing 28. The present invention also includes a seal 66 for closing the passage through the hub 24 to interior chamber 14. Seal 66 may take the form of a generally cylindrical deformable plug 68 which may be constructed of any resilient or elastomeric material. Deformable plug 68 is placed between a plate 72 and a plate 74. Plate 74 is held to a threaded tube 76 by nut 78. Tube 76 is free to pass through plate 72 at an opening 80 therethrough. Cylinder 82 holds a plunger 84 which moves along lining 86. Pneumatic source sends air into aperture 88 which moves plunger 84 upwardly. Plunger 84 is depicted in such upward position in FIG. 4. Rod 90 of plunger 84 is linked to tube 76 and connected plate 74 by block 92. Thus, moveable plate 74 serves as an element for pressing against deformable plug 68 when air is forced into aperture 76. As depicted in FIG. 4, plate 74 has moved upwardly according to directional arrow 94, squeezing and deforming deformable plug 68 between plate 74 and plate 72. Release of pneumatic pressure from aperture 88 permits plunger 84 and plate 74 to move downwardly, according to directional arrow 96, and for deformable plug 68 to assume its original cylindrical configuration. When deformable plug 68 is in the condition shown in FIG. 4, passage 64 is sealed against fluid escape.

Cylinder 82 is also moved upwardly and downwardly relative to torque converter 12 by the use of double-acting pneumatic cylinder 110. In other words, when air is passed into aperture 112, according to directional arrow 114, rod and plunger 116 moves upwardly, directional arrows 118. Rod and plunger 116 is connected to cap 122 atop cylinder 82. Air passed to chamber 124 of pneumatic cylinder 110 causes rod and plunger 116 to move downwardly, directional arrow 120. Directional arrows 128 and 130 depict the movement of air into and out of chamber 124, in this regard.

Means 98 is also included in the present invention for charging torque converter 12 interior chamber 14 with a fluid, such as air. Means 98 takes the form of passing fluid through aperture 100 in block 92 and through bore 102 of threaded tube 76. Directional arrows 104 and 106 on FIG. 4 depict the movement of fluid into interior chamber 14 of housing 28. Of course, such pneumatic fluid may also be pneumatic and emanate from common source in order to permit pneumatic fluid to also pass through apertures 88, 112, and 126, as heretofore described.

Returning to FIGS. 1–3, it may be seen that a container 132 is also shown which holds a body of liquid 134. Body of liquid 134 may be water, alcohol, or any like liquid. Container 132 includes an open top portion or mouth 136 to allow the operator of testing mechanism 10 the observe the escape of fluid, such as air, from torque converter 12 when the same is immersed in body of liquid 134. Other means for observing the escape of fluid from torque converter 12 may be employed, be it visual, sonic, electronic, or otherwise. Thus, mouth 136 serves as means 138 for observing the escape of fluid from torque converter 12.

Means 140 is also found in the present invention for positioning torque converter 12, while sealed by seal 66, into container 132 and body of liquid 134. Means 140 takes the form of an elevator 141 formed by a pair of double-acting pneumatic cylinders 142 and 144 which are connected to brace 146. Brace 146 is itself connected to posts 44 and 46. Rods 148 and 150 connect to the base member 154 upon which container 132 sits. Directional arrow 156, FIG. 3, indicates the movement upwardly of container 132 when torque converter 12 is rotated downwardly into the position shown thereat for immersion in body of liquid 136.

With reference to FIG. 6, a schematic rendition of the pneumatic system of the present mechanism is shown. A source of compressed air 158 is passed through gaging and regulating valve apparatus 160 to cylinder 82 in order to activate seal 66. Gaging and regulating valve apparatus 162 is employed to charge torque converter 12 with fluid such as air. Apparatuses 160 and 162 are of conventional configuration. In addition, source 158 provides compressed air to double-acting pneumatic cylinder 110 in order to move rod and plunger 116 upwardly or downwardly. That is to say, pneumatic line 164 moves rod and plunger 116 upwardly to lift deformable plug 68 from hub 24 of torque converter 12 after it has returned to its normal configuration. Pneumatic line 166 does the opposite by moving rod and plunger 116 downwardly and, thus deformable plug 68, into passage 64 of hub 24 of torque converter 12. Pneumatic valve 168 permits the user to direct air to either line 164 or 166, in this regard.

Also, source of compressed air 158 passes air to pneumatic valve 170 in order to direct air into double-acting cylinders 142 and 144 of elevator 141, which will either raise or lower container 132 as desired. In this aspect, pneumatic lines 172 and 174 provide compressed air to raise container 132. Likewise, pneumatic lines 176 and 178 serve to lower container 132.

In operation, the user connects torque converter 12 to base plate 26 by pneumatically lowering rod 116 and plate 72 downwardly against hub 24 of torque converter 12. Such positioning takes place by the introduction of air into cylinder 110 via aperture 126. Seal 66 is then activated by squeezing deformable plug 68 between plates 72 and 74 by the passage of air into aperture 88. Plunger 84 is raised by this expedient and moves plate 74 upwardly through the linkage of rod 90, block 92, and tube 76. Torque converter 12 is then placed in a vertical position as depicted in FIG. 1 directly over mouth 136 of container 132. Container 132 is then raised by activating elevator 141 by way of double-acting cylinders 142 and 144 to immerse torque converter 12 within body of liquid 136, FIG. 3. Air is then passed through aperture 100, either before or after immersion of torque converter 12 into body of liquid 34. The operator of mechanism 10 then is capable of observing any escape of air from torque converter 12 in the form of bubbles which are depicted as a lines of bubbles 180 in FIG. 3. Following such test for leakage of fluid from torque converter 12, torque converter 12 is then taken from body of liquid 134 by the lowering of container 132 via reverse activation of double acting cylinders 142 and 144. At this point means 48 may be activated to rotate torque converter 12 and support 30 to the horizontal position depicted in FIG. 1 along curved directional arrow 50. The user then may inspect or repair torque converter 12 at this juncture. Seal 66 may then be released by removing compressed air from aperture 88. Directing air to aperture 112 of cylinder 110 moves seal 66 upwardly from torque converter 12.

The preferred embodiments of the present invention have been set forth in considerable detail for the purposes of making a complete disclosure of the invention. It may be apparent to those of skill in the art that numerous changes may be made in such details to the heretofore described preferred embodiments without departing from the spirit and principles of the invention.

What is claimed is:

1. A testing mechanism for detecting a fluid leak in a torque converter having a housing with an interior chamber and a outwardly extending hub forming a passage to the interior chamber of the housing, comprising:
   a. a seal for closing the passage through the hub to the interior chamber of the housing;
   b. means for charging the torque converter housing interior chamber with a fluid;
   c. a container for a body of liquid;
   d. means for positioning the torque converter and said seal from a first position outside the body of liquid and to a second position into said container and the body of liquid, said means for positioning the torque converter into said body of liquid comprising a support for the torque converter, a mount for said container for the body of liquid, and means for selectively moving said support for the torque converter and said mount for said container for the body of liquid to create relative movement between the torque converter and the body of liquid, to immerse the torque converter in the body of liquid; and
   e. means for observing any escape of the fluid from the torque converter housing when the torque converter is positioned in the body of liquid.

2. The testing mechanism of claim 1 in which said seal comprises
   a. a deformable plug positioned within said passage; and
   b. means for deforming said deformable plug to closed said passage.

3. The testing mechanism of claim 2 in which said means for deforming said deformable plug comprises an element pressing said deformable plug.

4. The testing mechanism of claim 3 in which said means for charging the torque converter housing interior chamber with a fluid comprises an aperture through said deformable plug and means for forcing fluid through said aperture.

5. The testing mechanism of claim 1 in which said elevator and said means for moving said first plate towards said second plate includes a pneumatic motivation system.

6. The testing mechanism of claim 1 in which said means for selectively moving said support for the torque converter and said mount for said container for the liquid comprises an elevator for lifting the container for the body of liquid.

7. The testing mechanism of claim 1 which additionally comprises a support for the torque converter, said support including means for rotating said support for the torque converter relative to said container for the body of liquid.

8. The testing mechanism of claim 7 in which said means for rotating said support for the torque converter further comprises means for rotating said means for charging the torque converter housing interior chamber with a fluid.

9. The testing mechanism of claim 3 in which said element pressing said deformable plug comprises said deformable plug being positioned between first and second plates, and means for moving said first plate towards said second plate.

10. The testing mechanism of claim 9 in which said means for moving said first plate towards said second plate includes a plunger having a shaft connected to said first plate.

11. The testing mechanism of claim 10 in which said means for charging the torque converter housing interior chamber with a fluid comprises an aperture through said deformable plug and means for forcing fluid through said aperture.

* * * * *